United States Patent
Inada et al.

(10) Patent No.: US 7,372,466 B2
(45) Date of Patent: May 13, 2008

(54) IMAGE PROCESSING APPARATUS AND METHOD OF SAME

(75) Inventors: Tetsugo Inada, Tokyo (JP); Jin Satoh, Tokyo (JP); Yuji Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 10/385,100

(22) Filed: Mar. 10, 2003

(65) Prior Publication Data
US 2004/0012586 A1 Jan. 22, 2004

(30) Foreign Application Priority Data
Mar. 12, 2002 (JP) ............... 2002-066595

(51) Int. Cl.
*G06F 12/02* (2006.01)
*G06T 1/60* (2006.01)
*G06T 1/00* (2006.01)

(52) U.S. Cl. ............... 345/544; 345/530; 345/418

(58) Field of Classification Search ............... 345/530, 345/545, 441, 418, 423, 419, 505, 544, 543
See application file for complete search history.

(56) References Cited

U.S. PATENT DOCUMENTS

| | | | | |
|---|---|---|---|---|
| 5,598,517 A | * | 1/1997 | Watkins | 345/441 |
| 5,764,243 A | * | 6/1998 | Baldwin | 345/506 |
| 5,852,443 A | * | 12/1998 | Kenworthy | 345/441 |
| 5,914,722 A | * | 6/1999 | Aleksic | 345/423 |
| 6,856,320 B1 | * | 2/2005 | Rubinstein et al. | 345/543 |
| 6,879,324 B1 | * | 4/2005 | Hoppe | 345/423 |
| 2003/0142103 A1 | * | 7/2003 | Hussain et al. | 345/545 |

FOREIGN PATENT DOCUMENTS

JP 07-152357 6/1995

(Continued)

OTHER PUBLICATIONS

Breitfelder, K.; Messina, Don. The Authoritative Dictionary of IEEE Standards Terms. 2000. IEEE Press. Seventh Edition, p. 104, 789.*
Web Services Glossary. NameSecure. http://www.namesecure.com/en_US/index.jhtml?cat=glossary&subCat=abcd.*

(Continued)

*Primary Examiner*—Kee M. Tung
*Assistant Examiner*—Joni Hsu
(74) *Attorney, Agent, or Firm*—Finnegan, Henderson, Farabow, Garrett & Dunner, L.L.P.

(57) ABSTRACT

An image processing apparatus, able to suppress occurrence of a penalty such as page miss and able to efficiently draw an image, provided with a triangle transfer control device for judging whether a triangle is inside/outside a page, detecting a page where a triangle may be drawn, preparing a list of pages where triangles will be drawn, taking out a page from this list, outputting the triangle data and the corresponding drawing page data to a triangle drawing device so as to draw the object (triangle) for only the interior of the region of that page, erasing the output drawing page from the prepared list, and outputting triangle data and corresponding drawing page data until there are no longer pages on the list so as to draw all triangles in the pages.

8 Claims, 15 Drawing Sheets

FOREIGN PATENT DOCUMENTS

| | | |
|---|---|---|
| JP | 07-319436 | 12/1995 |
| JP | 09-305776 | 11/1997 |
| JP | 11-144451 | 5/1999 |
| JP | 2000-123157 A | 4/2000 |
| JP | 2000-250528 A | 9/2000 |
| JP | 2001-283242 | 10/2001 |
| WO | WO 01/06461 A1 | 1/2001 |

OTHER PUBLICATIONS

Office Action from the Japanese Patent Office in counterpart Japanese Appl. No. 2002-066595, mailed Oct. 31, 2006.

Office Action from the Japanese Patent Office in counterpart Japanese Appl. No. 2002-066595, mailed Jan. 30, 2007.

* cited by examiner

IMAGE PROCESSING APPARATUS AND METHOD OF SAME

BACKGROUND OF THE INVENTION

1. Field of the Invention

The present invention relates to an image processing apparatus for expressing a model by a combination of unit graphics and generating pixels in a drawn object region of a screen coordinate system and a method of the same.

2. Description of the Related Art

Along with also the improvement of operating speeds and the strengthening of graphic drawing functions in recent computer systems, computer graphics (CG) technology for using computer resources to prepare and process graphics and images is currently the subject of active research and development efforts and is being put into practical use.

For example, in three-dimensional graphics, the optical phenomenon when a three-dimensional object is illuminated by a predetermined light source is expressed by a mathematical model and the surface of the object is given shading or lighting or given a pattern based on this model to thereby to generate a more realistic, three-dimensional-like two-dimensional high definition image.

Such computer graphics is being increasingly utilized in CAD/CAM in the development field of science, industry, manufacture, etc. and other various types of fields of application.

Three-dimensional graphics is generally comprised by a geometry sub-system positioned as the front end and a raster sub-system positioned as the back end.

The "geometry sub-system" is the step for performing geometric operation processing on a position, posture, etc. of a three-dimensional object displayed on a display screen.

In the geometry sub-system, the object is generally handled as an aggregate of a large number of polygons, and geometric operation processing such as coordinate conversion, clipping, and light source calculation are performed in units of polygons.

On the other hand, the "raster sub-system" is the step for painting each pixel constituting the object.

The rasterizing is realized by for example interpolating the image parameters of all pixels included inside a polygon on the basis of the image parameters found for the vertexes of the polygon.

The image parameters referred to here include color (drawn color) data expressed by a so-called RGB format or the like, a z-value expressing a distance in a depth direction, and so on.

Further, in recent high definition three-dimensional graphics processing, a fog (f) for causing a perspective feeling, a texture (t) for expressing the feeling of the material and pattern of the object surface to impart realism, etc. are also included as image parameters.

Here, the processing for generating pixels inside a polygon from the vertex information of the polygon is executed by using a linear interpolation technique frequently referred to as a "digital differential analyzer" (DDA).

In the DDA process, the inclination of data to a side direction of the polygon is found from the vertex information, the data on the side is calculated by using this inclination, then the inclination of a raster scan direction (X-direction) is calculated, and the amount of change of the parameter found from this inclination is added to the parameter values of the start point of the scan so as to generate internal pixels.

The generated pixel data is subjected to various tests in the processing on the pixel level and the passing data is drawn in a memory module. This memory module is interleaved by a predetermined size, for example, 4×4 rectangular region units, by a processing circuit.

The data accessed in for example a 2×4 pixel region in the memory is stored in a region indicated by pages (rows) and blocks (columns) as shown in FIG. 1.

Each of the rows ROW0 to ROW7 is sectioned into four columns (blocks BK-A, BK-B, BK-C, BK-D) as shown in FIG. 1.

Access (writing and reading) is carried out in a region of a boundary of 8 pixels in the x-direction and an even number of boundaries in the y-direction.

Due to this, access spanning for example the rows ROW0 and ROW1 or the rows ROW4 and ROW5 is not performed and occurrence of so-called "page violation" is suppressed.

However, when using for example parallel processing, as shown in FIG. 1, to simultaneously draw two primitives (triangles) PM1 and PM2, the block BK-C of the row ROW6 and the block BK-C of the row ROW7 are in the same bank, so cannot be simultaneously activated.

Accordingly, in a conventional image processing apparatus, when performing parallel processing in units of primitives, there is frequently a penalty with respect to a page, so there was the disadvantage that the graphic could not be efficiently generated.

SUMMARY OF THE INVENTION

An object of the present invention is to provide an image processing apparatus able to suppress the occurrence of a penalty such as a page miss and able to efficiently draw an image and a method of the same.

To attain the above object, according to a first aspect of the present invention, there is provided an image processing apparatus for expressing a primitive as a combination of unit graphics and drawing unit graphics in a memory, in the memory, memory regions which can be activated being sectioned into predetermined page units, provided with a unit graphic transfer control device for detecting a page where the unit graphic may be drawn and generating unit graphic data and corresponding drawing page data so as to generate the unit graphic for only the inside of the region of the detected page and a drawing device for receiving the unit graphic data and corresponding drawing page data from the unit graphic transfer control device and performing processing for drawing at least one unit graphic for a designated page.

Preferably, the unit graphic transfer control device detects a page where the unit graphic may be drawn by whether the unit graphic is inside/outside a page.

Alternatively, the unit graphic transfer control device prepares a list of pages where unit graphics will be drawn, takes out a page from this list, and outputs unit graphic data and corresponding drawing page data to the drawing device so as to draw the unit graphic for only the interior of the region of the taken out page.

Preferably, the unit graphic transfer control device erases the output drawing page from the prepared list and outputs the unit graphic data and corresponding drawing page data to the drawing device until there are no longer any pages on the list.

Preferably, the unit graphic transfer control device outputs the unit graphic data to the drawing device together with the corresponding drawing page data so as to draw all unit graphics in the region of a page.

Preferably, the unit graphic transfer control device has a drawing page judgment device and a memory device, the drawing page judgment device detects a page where a unit graphic may be drawn, stores the unit graphic data and the detected drawing page data which may be drawn in the memory device, selects one page at a time from the stored drawing page data, and outputs the unit graphic data to be drawn on the selected page and the corresponding drawing page data to the drawing device.

More preferably, the drawing page judgment device makes the memory device output the unit graphic data and the corresponding drawing page data to a processing circuit, then erase the selected page data.

Preferably, the apparatus is further provided with a high order page primitive processing device for receiving high order primitive data in a high order primitive mode and, when the high order primitive data spans a plurality of page regions, generating at least one unit graphic for every page so that one side among sides of the unit graphic is located at a boundary between adjacent pages and no page boundary is straddled, and supplying the generated unit graphic data and page information to the unit graphic transfer control device.

According to a second aspect of the present invention, there is provided an image processing method for expressing a primitive as a combination of unit graphics and drawing unit graphics in a memory comprising a first step of sectioning memory regions which can be activated at the same time into predetermined page units in the memory; a second step of detecting a page where a unit graphic may be drawn; a third step of generating and outputting unit graphic data and corresponding drawing page data so as to draw a unit graphic for only the interior of the region of the detected page; and a fourth step of receiving the generated unit graphic data and corresponding drawing page data and performing processing for drawing at least one unit graphic for a designated page.

Preferably, the method further comprises, in the second step, detecting a page where a unit graphic may be drawn by judging if a unit graphic is inside/outside of a page.

Alternatively, the method further comprises, in the second step, preparing a list of pages where a unit graphic will be drawn and, in the third step, taking out a page from the list and outputting the unit graphic data and the corresponding drawing page data so as to draw the unit graphic for only the interior of the region of the taken out page.

Preferably, the method further comprises, in the third step, erasing one output drawn page from the prepared list and outputting unit graphic data and corresponding drawn page data until there are no longer any pages on the list.

Preferably, the method further comprises, in the third step, outputting the unit graphic data together with the corresponding drawn page data so as to draw all unit graphics in a page region.

Alternatively, the method further comprises a fifth step, in a high order primitive mode, before the second step, when high order primitive data spans a plurality of page regions, generating at least one unit graphic for every page so that one side among sides of the unit graphic is located at a boundary between adjacent pages and no page boundary is straddled and outputting the generated unit graphic data and page information.

According to the present invention, required graphics data is read out from a main memory in accordance with for example the progress of an application.

Then, a host controller performs predetermined processing on this graphics data, generates unit graphic data of a world coordinate system, performs geometry processing etc., and supplies the result to the unit graphic transfer control device.

At the time of a high order primitive mode such as curved surface processing, the host controller generates high order primitive data and supplies it to a high order primitive processing device.

In the high order primitive mode, the high order primitive processing device receives high order primitive data spanning a plurality of pages supplied from the host controller and generates a unit graphic for every page so that one side among the sides of the unit graphic is located at a boundary between adjacent pages and the generated unit graphic does not straddle a page boundary.

The unit graphic data generated for every page by the high order primitive processing device is subjected to geometry processing together with each page information and then supplied to the unit graphic transfer control device.

The unit graphic transfer control device receives the unit graphic data after the geometry processing and detects a page where a unit graphic may be drawn by for example judging whether a unit graphic is inside/outside a page by a drawing page judgment circuit.

The drawing page judgment circuit prepares a list of pages where unit graphics comprising the object will be drawn and stores it in the memory device.

The unit graphic transfer control device takes out a page from this prepared list and outputs the unit graphic data and the corresponding drawing page data to the drawing device so as to draw the unit graphic for only the interior of the region of that page.

The unit graphic transfer control device erases the output drawing page from the prepared list. It outputs the unit graphic data and the corresponding drawing page data to the drawing device until there are no longer any pages on the list to draw all unit graphics in the pages.

The drawing device receives the unit graphic data and corresponding drawing page data from the unit graphic transfer control device and performs processing for drawing at least one unit graphic with respect to the designated page.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Below, an explanation will be given of a three-dimensional computer graphics system applicable to a personal computer etc. for displaying a desired three-dimensional image of any three-dimensional object model on a cathode ray tube (CRT) or other display at a high speed.

Figure 1:
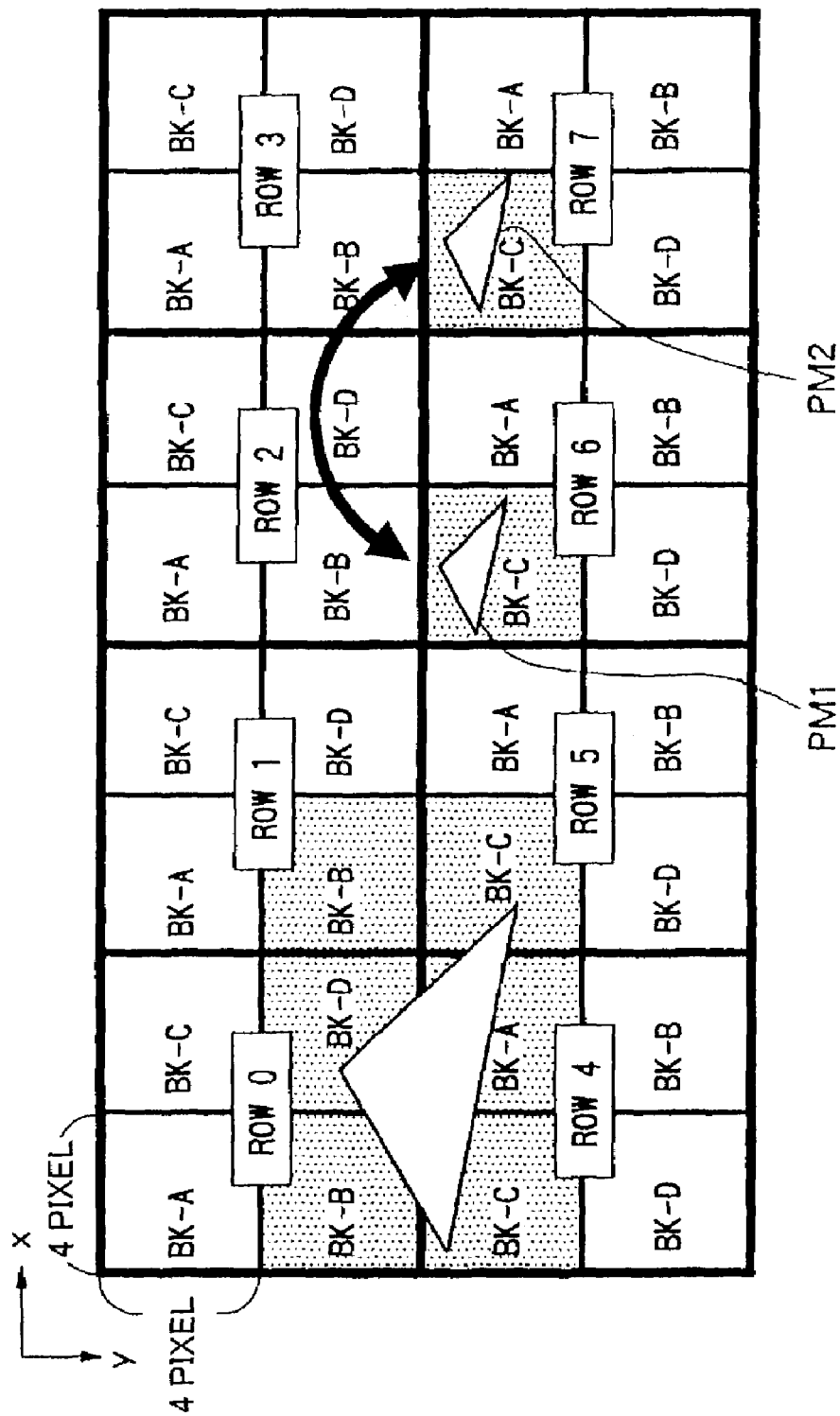
FIG. 1 is a view for explaining the problem of the related art.
Figure 2:
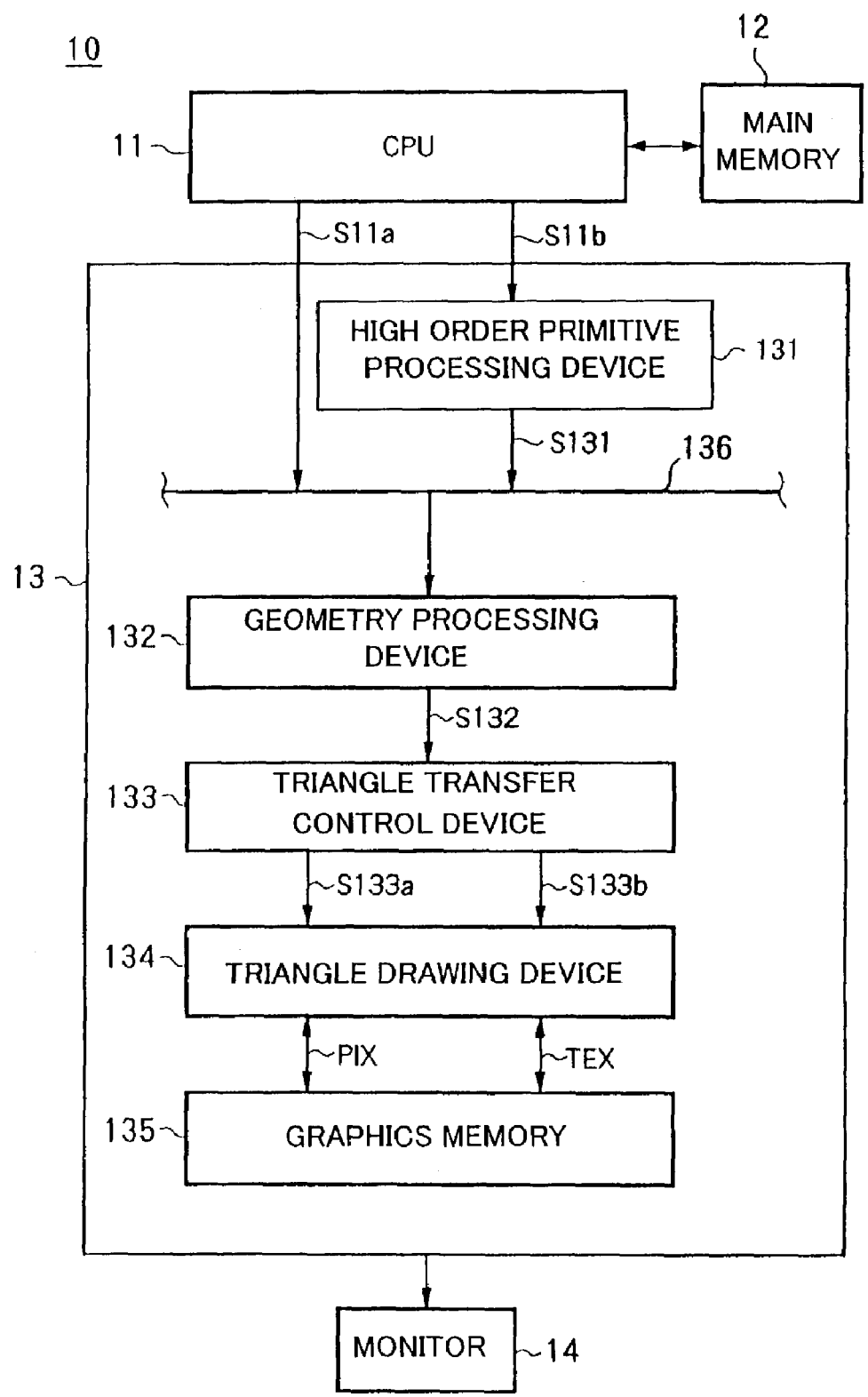
FIG. 2 is a view of the system configuration of a three-dimensional computer graphics system as an image processing apparatus according to the present invention.

FIG. 2 is a view of the system configuration of a three-dimensional computer graphics system 10 comprising an image processing apparatus according to the present invention.

The three-dimensional computer graphics system 10 is a system for polygon rendering for expressing a three-dimensional model (primitive) as a combination of triangles (polygons) as unit graphics, determining the color of each pixel of the display screen by drawing these polygons, and displaying the result on a display.

The three-dimensional computer graphics system 10 expresses a three-dimensional object by using the (x, y) coordinates expressing a position on a plane and also a z-coordinate expressing the depth and specifies any point in a three-dimensional space by the three coordinates of (x, y, z).

As shown in FIG. 2, the three-dimensional computer graphics system 10 has a main processor (CPU) 11, a main memory 12, a graphics processor 13, and a monitor 14 such as a CRT.

Note that, in the present embodiment, a graphics memory 135 is sectioned into a plurality of regions using units which can be activated at the same time as page units.

The main processor 11 reads out the required graphics data from the main memory 12 in accordance with the state of progress of the application etc., applies predetermined processing to this graphics data to generate triangle data S11a of a so-called world coordinate system, and outputs the result to the graphics processor 13.

The main processor 11 also generates high order primitive data S11b in a high order primitive mode such as curved surface processing and outputs the same to the graphics processor 13.

The graphics processor 13 has a high order primitive processing device 131, a geometry processing device 132, a triangle transfer control device 133, a triangle drawing device 134, a graphics memory 135. and a data bus 136.

Figure 3A:
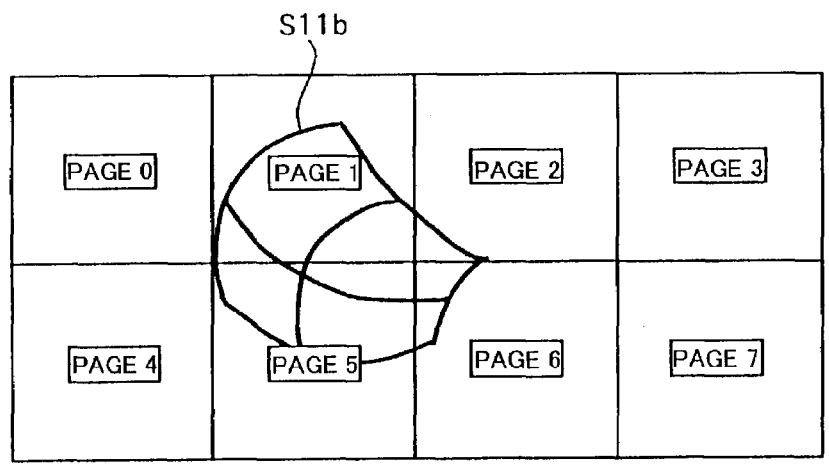
FIGS. 3A and 3B are views for explaining high order primitive processing in a high order primitive processing device of FIG. 2.
Figure 3B:
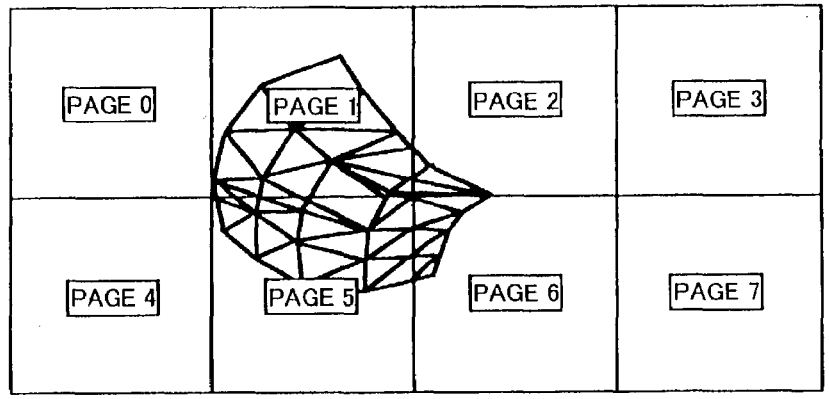

The high order primitive processing device 131 receives the high order primitive data S11b spanning a plurality of pages supplied by the main processor 11 as shown in FIG. 3A, generates triangles (divides the primitive) as shown in FIG. 3B by generating triangles so that one side among three sides of any triangle near a boundary between adjacent pages will be located at the boundary and therefore no generated triangle will straddle any page boundary, and outputs the corresponding triangle data S131 to the geometry processing device 132 together with each page information via the data bus 136.

The geometry processing device 132 performs coordinate conversion, clipping, lighting, and other geometry processing on the triangle data S11a from the main processor 11 or the triangle data S131 from the high order primitive processing device 131 input via the data bus 136, generates triangle data (polygon rendering data) S132, and outputs the same to the triangle transfer control device 133.

Figure 4:
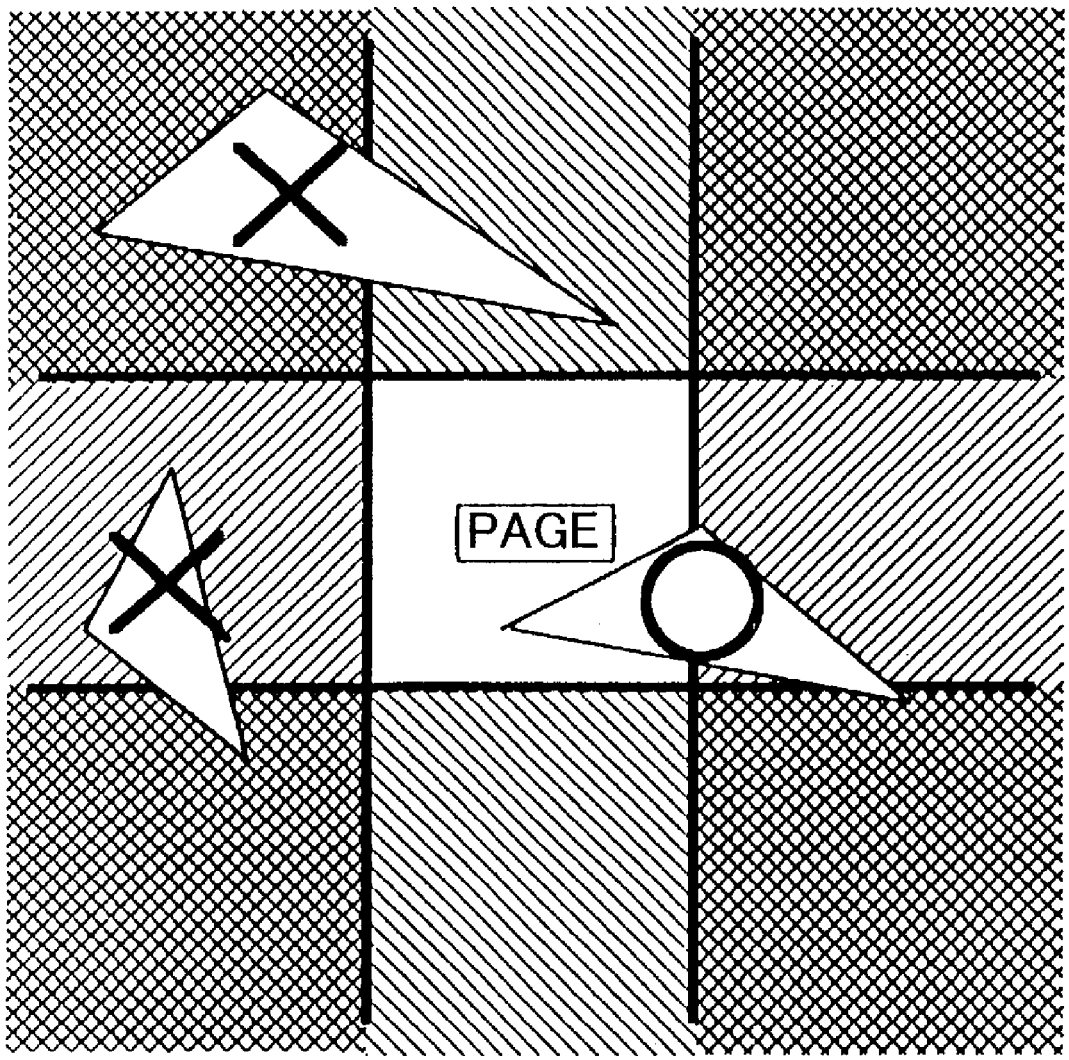
FIG. 4 is a view for explaining processing for detection of a page where a triangle may be drawn in a triangle transfer control device of FIG. 2.

The triangle transfer control device 133 receives the triangle data S132 from the geometry processing device 132, judges if a triangle is inside/outside a page as shown in FIG. 4, and therefore detects a page where a triangle may be drawn.

Figure 5:
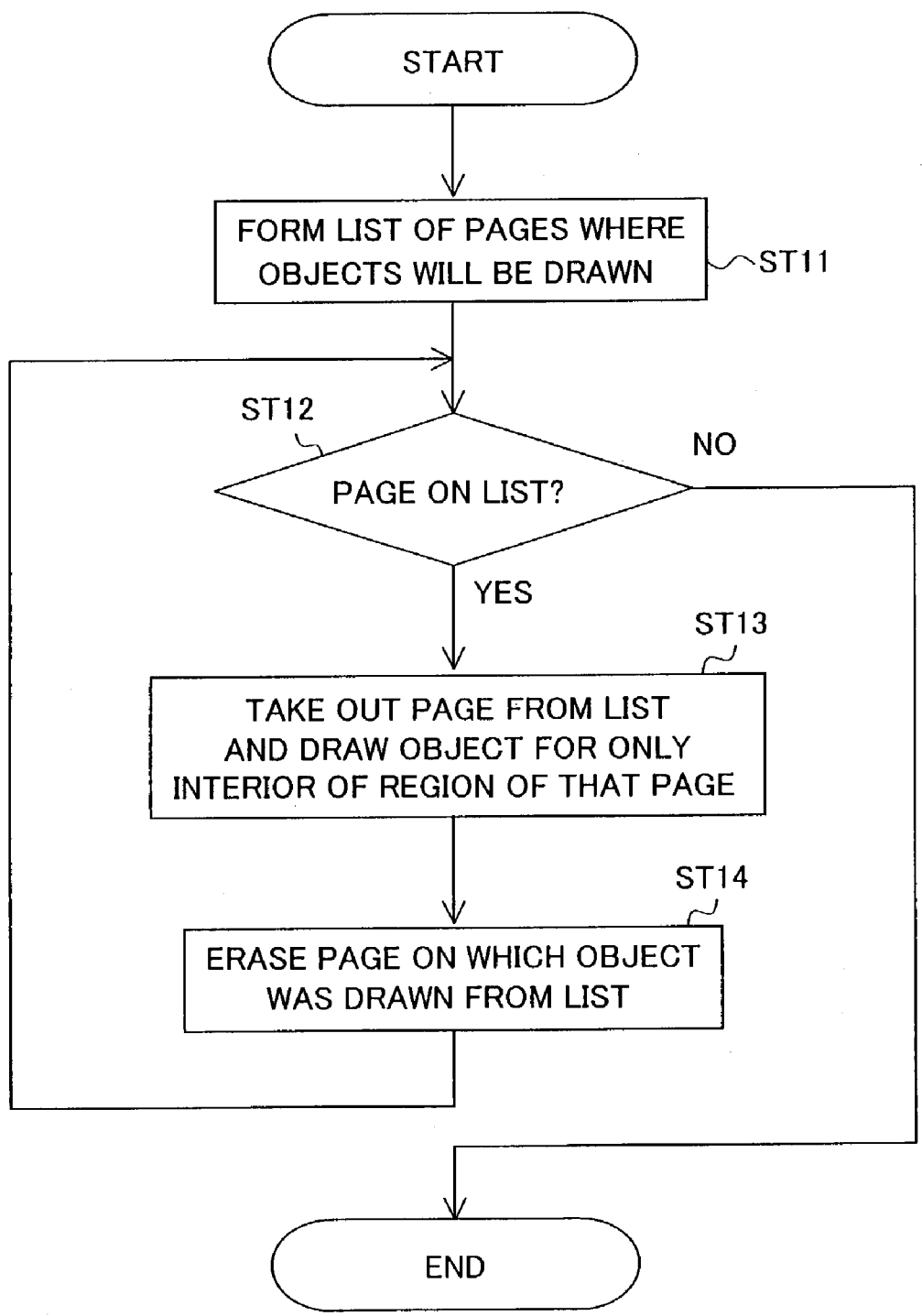
FIG. 5 is a flow chart for explaining the operation of the triangle transfer control device of FIG. 2.

Then, the triangle transfer control device 133 prepares a list of pages where triangles composing the object will be drawn as shown in FIG. 5 (ST11), takes out a page from this list, and outputs triangle data S133a and corresponding drawing page data S133b to the triangle drawing device 134 so as to draw the object (triangle) for only the interior of the region of that page (ST12, ST13).

Also, the triangle transfer control device 133 erases the output drawing page from the list prepared at step ST11 (ST14) and outputs triangle data S133a and corresponding drawing page data S133b so as to perform the processings of steps ST12 to ST14 until there are no longer any pages on the list to draw all triangles in the pages.

Figure 6:
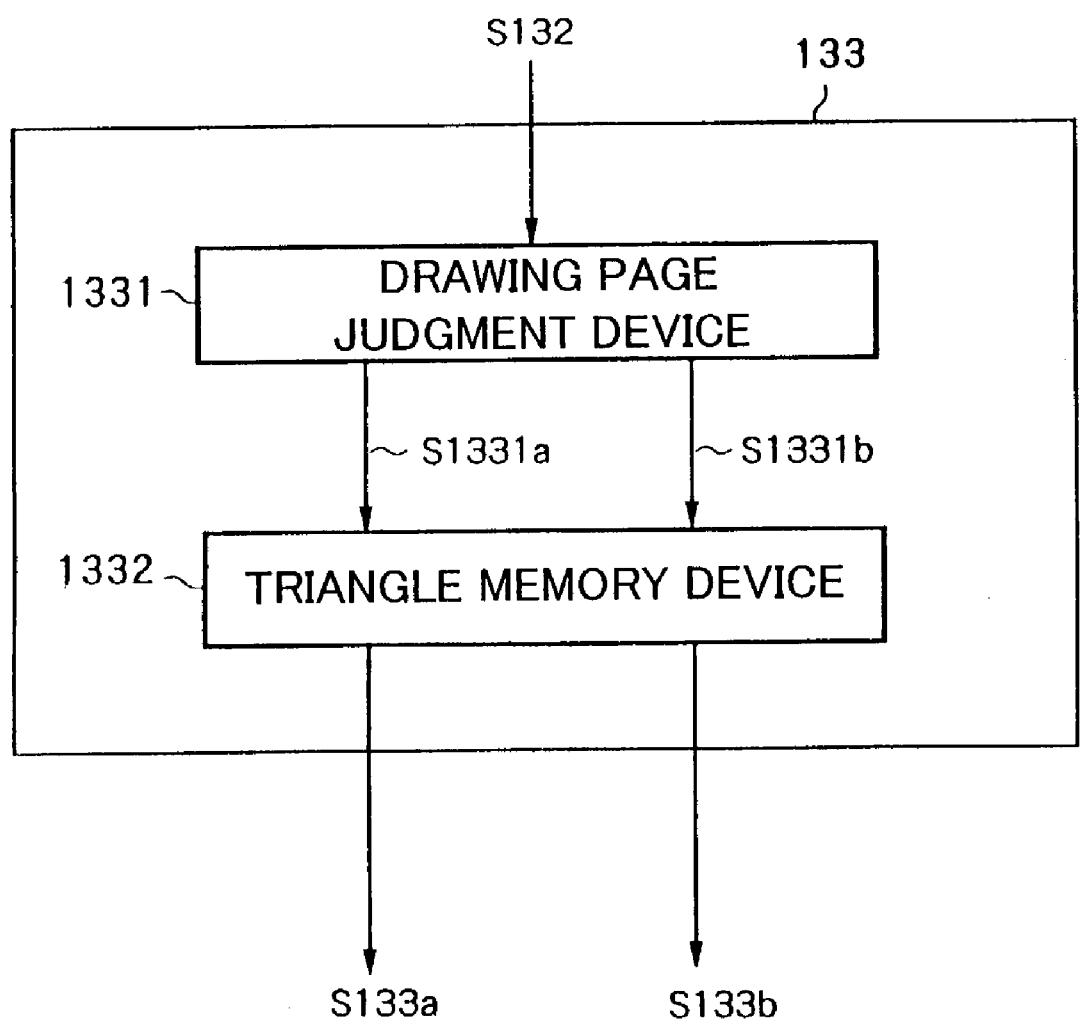
FIG. 6 is a block diagram of an example of the configuration of a triangle transfer control device according to the present embodiment.

FIG. 6 is a block diagram of an example of the configuration of the triangle transfer control device 133.

The triangle transfer control device 133 has a drawing page judgment device 1331 and a triangle memory device 1332 as shown in FIG. 6.

The drawing page judgment device 1331 receives the triangle data S132 from the geometry processing device 132, detects a page where a triangle may be drawn, and makes the triangle memory device 1332 store this triangle data S1331a and the detected page data S1331b which may be drawn. The drawing page judgment device 1331 prepares for example a so-called hash table and stores the data in the triangle memory device 1332.

Further, the drawing page judgment device 1331 makes the triangle memory device 1332 select one page at a time from among the stored page data and output the triangle data S133a to be drawn on the selected page and the corresponding drawing page data S133b to the triangle drawing device 134 of the next stage.

Further, the drawing page judgment device 1331 makes the triangle memory device 1332 erase the selected page data after outputting the triangle data S133a and the corresponding drawing page data S133b to the triangle drawing device 134.

The triangle memory device 1332 stores the triangle data S1331a from the drawing page judgment device 1331 and the detected drawing page data S1331b which may be drawn, outputs the triangle data S133a to be drawn on the selected page and the corresponding drawing page data S133b to the triangle drawing device 134 of the next stage in accordance with an instruction from the drawing page judgment device 1331, and erases the selected drawing page data after the data output.

Figure 7:
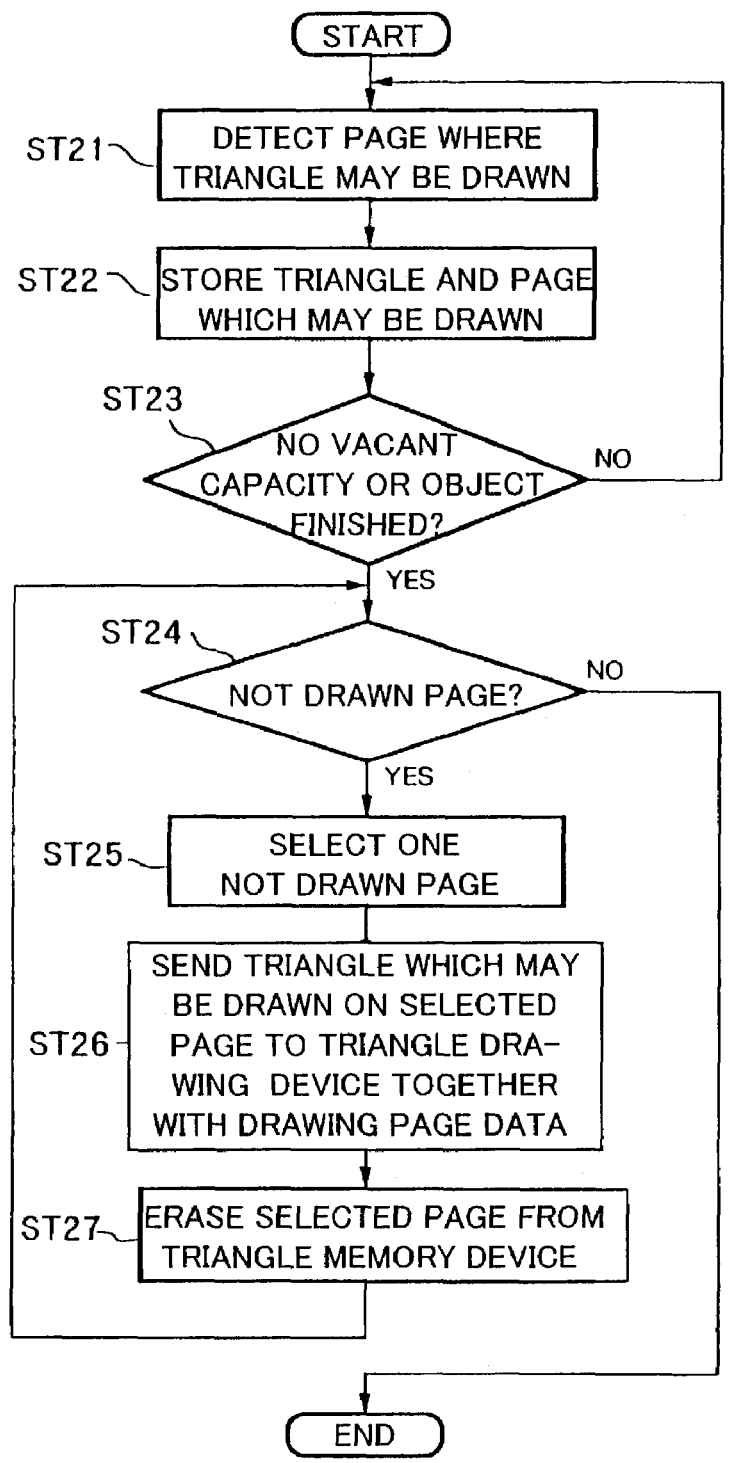
FIG. 7 is a flow chart for explaining the operation of the triangle transfer control device of FIG. 6.

FIG. 7 is a flow chart for explaining the operation of the triangle transfer control device of FIG. 6.

As shown in FIG. 7, the triangle transfer control device 133 performs the processing of the following steps ST21 to ST27.

At step ST21, the drawing page judgment device 1331 receives the triangle data S132 from the geometry processing device 132 and detects a page where a triangle may be drawn.

Next, at step ST22, the triangle memory device 1332 stores the triangle data S1331a and the detected drawing page data S1331b which may be drawn.

At step ST23, the drawing page judgment device 1331 judges whether is no longer any vacant capacity in the triangle memory device 1332 or whether the object has been finished.

When a negative judgment result is obtained at step ST23, the routine returns to the processing of step ST21, while when a positive judgment result is obtained, the routine shifts to the processing of the next step ST24.

At step ST24, the device judges by the drawn page judgment device 1331 whether there is a page not drawn in the triangle memory device 1332.

When it is judged at step ST24 that there is a not drawn page, the routine shifts to the processing of the next step ST25.

At step ST25, the drawing page judgment device 1331 selects one not drawn page from the list of pages, then the routine shifts to the processing of the next step ST26.

At step ST26, the triangle data S133a to be drawn on the selected page and the corresponding drawing page data S133b are output from the triangle memory device 1332 to the triangle drawing device 134, then the routine shifts to the next step ST27.

At step ST27, the selected page data is erased from the triangle memory device 1332, then the routine returns to the processing of step ST24, where the processing of steps ST25 to ST27 is repeated until there are no longer any not drawn pages.

The processing of the triangle transfer control device 133 for performing the above processing will be further explained in relation to FIG. 8 to FIG. 11 based on a concrete model.

FIGS. 8 to 11 are views for explaining concrete processing with respect to a model straddling four pages in a triangle transfer control device according to the present embodiment.

Figure 8:
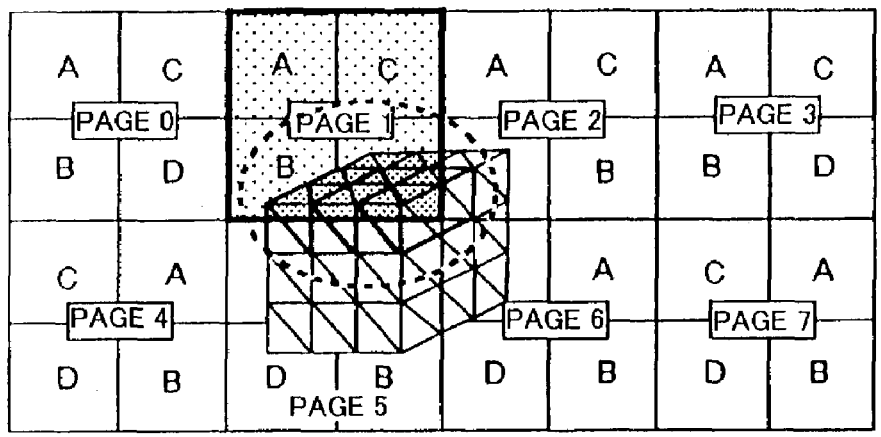
FIG. 8 is a view for explaining concrete processing with respect to a model spanning four pages in the triangle transfer control device according to the present embodiment.

In the present embodiment, data accessed in for example a 2×8 pixel area of the memory is stored in a region indicated by pages and blocks as shown in FIG. 8.

Each of the pages 0 to 7 is sectioned into four blocks BK-A, BK-B, BK-C, and BK-D as shown in FIG. 8.

In the present embodiment, memory regions which can be activated all together are collected into units referred to as "pages", and the graphics are drawn inside the pages.

In the example of FIG. 8 to FIG. 11, a three-dimensional model (primitive) straddles a plurality of pages, concretely page 1, page 2, page 5, and page 6. For this reason, the triangle transfer control device 133 lists page 1, page 2, page 5, and page 6 in the page list.

Since no penalty occurs so far as graphics are drawn only inside pages, first, as shown in FIG. 8, all triangle data S133a to be drawn in page 1 and the corresponding drawing page data S133b are sequentially transferred to the triangle drawing device 134 to make it draw the graphics for page 1.

After transferring the triangle data S133a concerning page 1 and making the triangle drawing device 134 draw the graphics concerning page 1, page 1 is erased from the page list.

Figure 9:
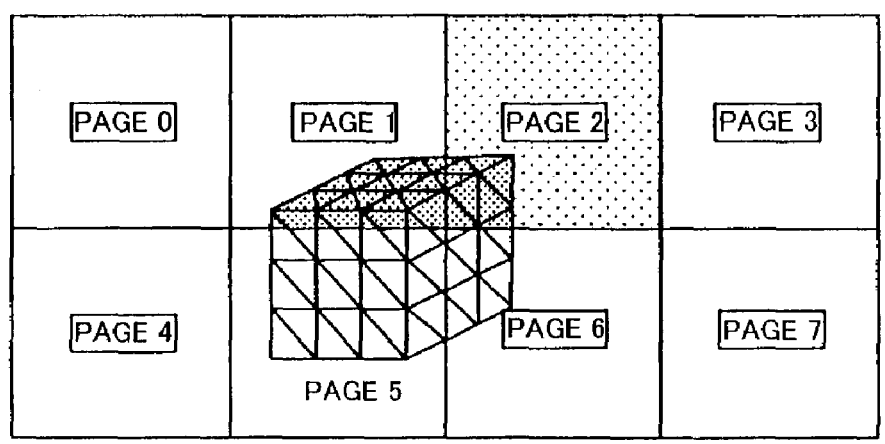
FIG. 9 is a view for explaining concrete processing with respect to a model spanning four pages in the triangle transfer control device according to the present embodiment.

Next, as shown in FIG. 9, all triangle data S133a to be drawn in page 2 and the corresponding drawing page data S133b are sequentially transferred to the triangle drawing device 134 to make it draw the graphics concerning page 2.

After transferring the triangle data S133a concerning page 2 and making the triangle drawing device 134 draw the graphics concerning page 2, page 2 is erased from the page list.

Figure 10:
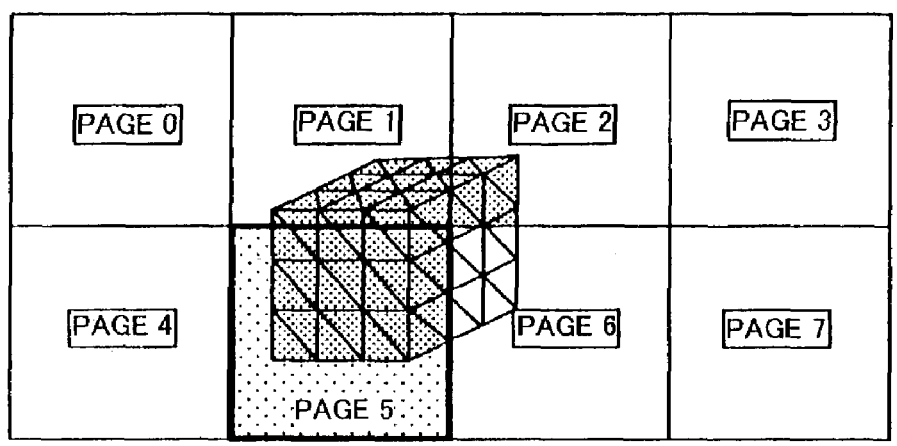
FIG. 10 is a view for explaining concrete processing with respect to a model spanning four pages in the triangle transfer control device according to the present embodiment.

Next, as shown in FIG. 10, all triangle data S133a to be drawn in page 5 and the corresponding drawing page data S133b are sequentially transferred to the triangle drawing device 134 to make it draw the graphics concerning page 5.

After transferring the triangle data S133a concerning page 5 and making the triangle drawing device 134 draw the graphics concerning page 5, page 5 is erased from the page list.

Figure 11:
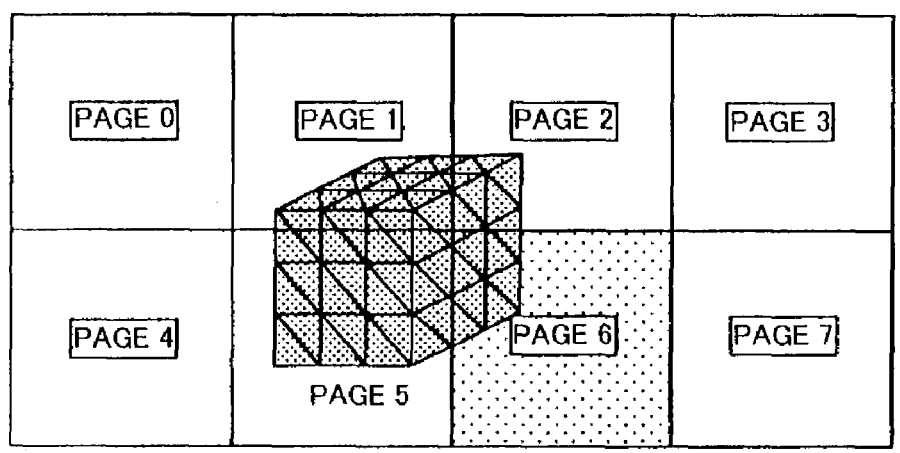
FIG. 11 is a view for explaining concrete processing with respect to a model spanning four pages in the triangle transfer control device according to the present embodiment.

Next, as shown in FIG. 11, all triangle data S133a to be drawn in page 6 and the corresponding drawn page data S133b are sequentially transferred to the triangle drawing device 134 to make it draw the graphics concerning page 6.

After transferring the triangle data S133a concerning page 6 and making the triangle drawing device 134 draw the graphics concerning page 6, page 6 is erased from the page list.

In this way, no penalty occurs so far as the graphics are drawn in the pages, so the drawing performance will not fall even with parallel processing.

The triangle drawing device 134 receives the triangle data S133a to be drawn and the corresponding drawing page data S133b from the triangle transfer control device 133, performs processing such as linear interpolation as will be explained in detail below, draws pixel data PIX and texture data TEX in the graphics memory in units of pages which can be activated all together, performs processing for reading the display data to the monitor 14, and so on.

The triangle data (polygon rendering data) input to the triangle drawing device 134 includes the data of (x, y, z, R, G, B, s, t, q) of each of the three vertexes of the polygon.

Here, the (x, y, z) data indicate three-dimensional coordinates of a vertex of the triangle (polygon), and (R, G, B) data indicate luminance values of red, green, and blue at the three-dimensional coordinates.

Among the (s, t, q) data, (s, t) indicates the homogeneous coordinates of the corresponding texture, and q indicates a homogeneous term. Here, "s/q" and "t/q" are multiplied by texture sizes USIZE and VSIZE to obtain the actual texture coordinate data (u, v).

The texture data stored in the graphics memory (specifically a texture buffer described later) 135 from the triangle drawing device 134 is accessed using the texture coordinate data (u, v).

Namely, the polygon rendering data comprises the physical coordinate values of the vertexes of a triangle, the colors of the vertexes, and the texture data.

Below, a detailed explanation will be given of the triangle drawing device 134.

Figure 12:
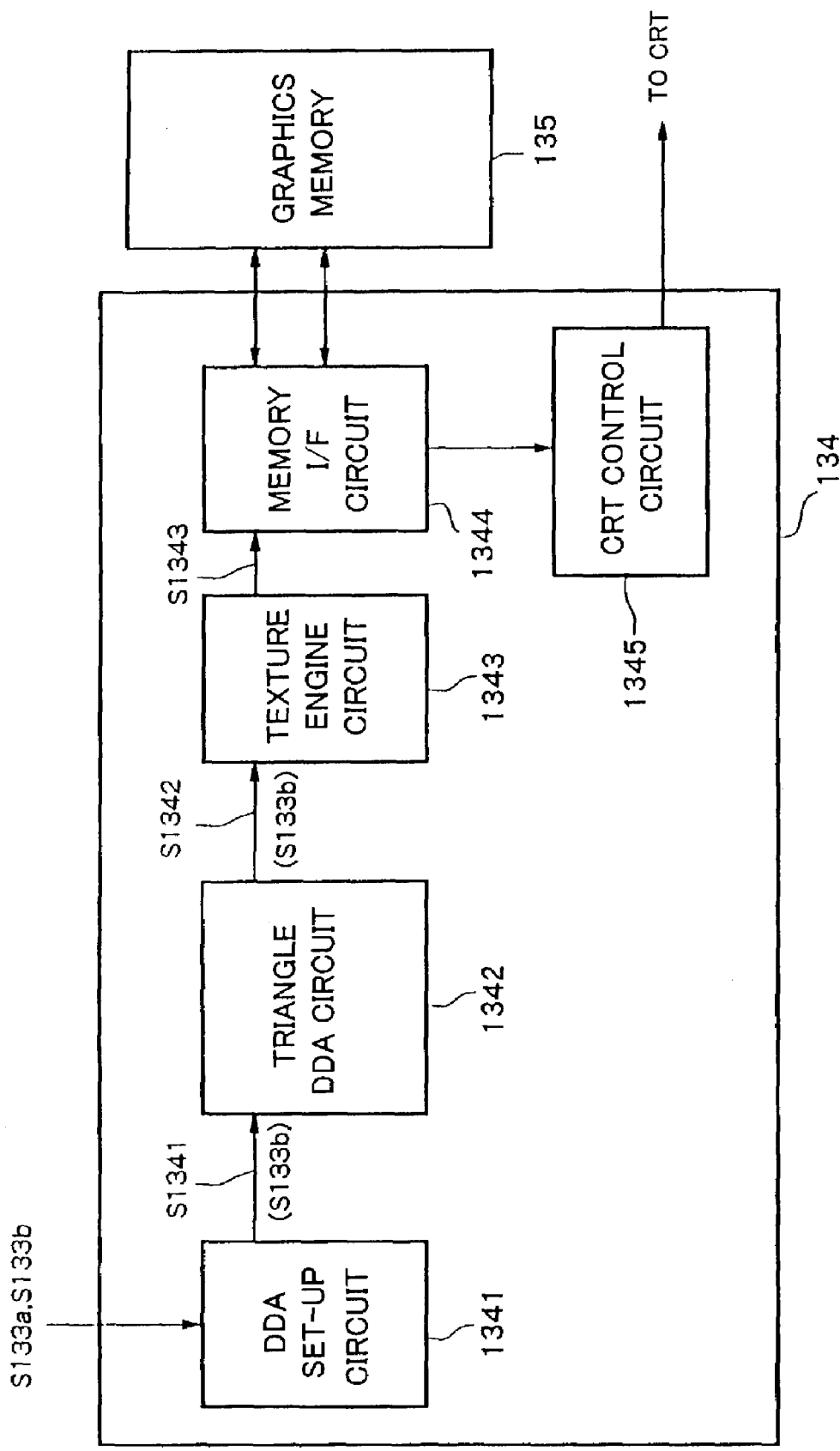
FIG. 12 is a block diagram of an example of the configuration of a triangle drawing device according to the present embodiment.

As shown in FIG. 12, the triangle drawing device 134 has a digital differential analyzer (DDA) set-up circuit 1341 as an initialization block for a linear interpolation operation, a triangle DDA circuit 1342 as a linear interpolation block, a texture engine circuit 1343, a memory interface (I/F) circuit 1344, and a CRT control circuit 1345.

Below, the configurations and functions of the blocks of the triangle drawing device 134 will be sequentially explained with reference to the drawings.

Before linearly interpolating the values of the vertexes of a triangle on the physical coordinate system in the later stage triangle DDA circuit 1342 to find the color and depth information of each pixel inside the triangle, the DDA set-up circuit 1341 performs the set-up operation for finding the difference from sides of the triangle in the horizontal direction etc. for the (z, R, G, B, s, t, q) data indicated by the triangle data (polygon rendering data) S133a.

This set-up operation specifically calculates a change of the value to be found in a case of a unit length of movement by using the value of the start point and the value of the end point and a distance between the start point and the end point.

The DDA set-up circuit 1341 outputs set-up data S1341 including calculated change data as information concerning the primitive and the page data S133b to the triangle DDA circuit 1342.

Figure 13:
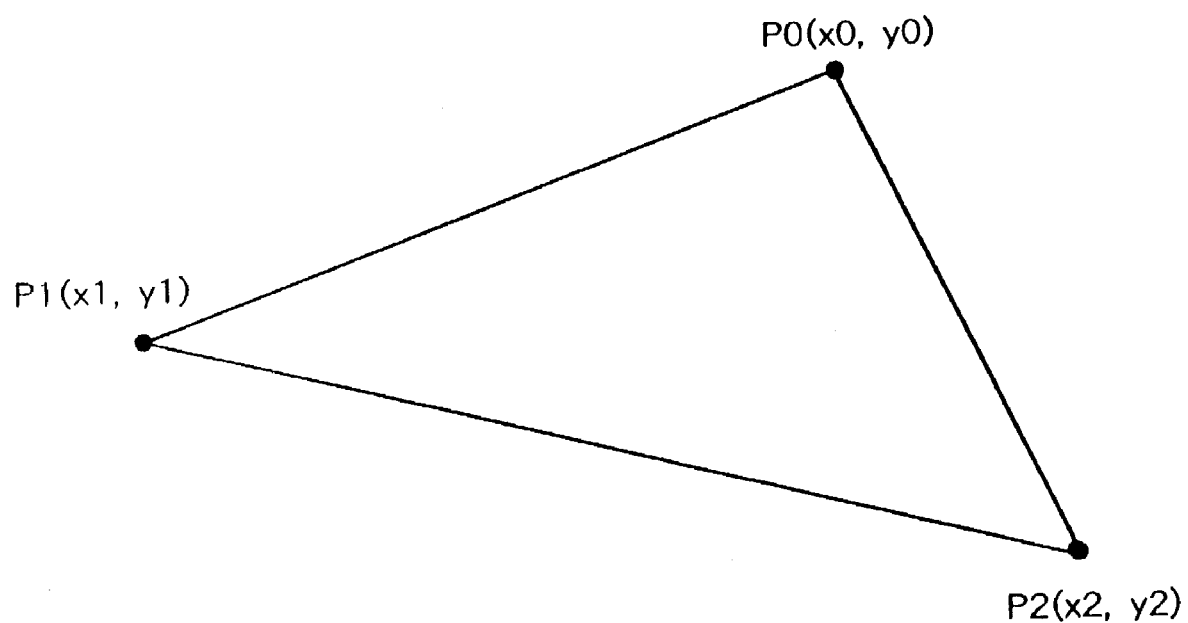
FIG. 13 is a view for explaining a function of a DDA set-up circuit according to the present embodiment.

The functions of the DDA set-up circuit 1341 will be further explained with reference to FIG. 13.

As explained above, the main processing of the DDA set-up circuit 1341 is to find the change inside a triangle comprised of three given vertexes P0 (x0, y0), P1 (x1, y1), and P2 (x2, y2) for various information (color and texture coordinates) at the vertexes after the prior stage geometry processing and settling down to physical coordinates and to calculate the basic data of the later stage linear interpolation.

A triangle is basically drawn by drawing individual pixels, but it is necessary to find the first values at the start point of drawing for this purpose.

The various information at the first drawn point are the values obtained by multiplication with the change in the horizontal direction in the horizontal distance from a vertex to the first drawn point plus the values obtained by multiplication with the change in the vertical direction in the vertical distance. Once the values on one whole lattice inside the object triangle are found, it becomes possible to find values at the other lattice points inside the object target triangle by whole multiples of the changes.

In each vertex data of the triangle, for example the x, y coordinates consist of 16 bits, the z-coordinate consists of 24 bits, each of the RGB color values consists of 12 bits (=8+4), each of the s, t, q texture coordinates consists of a 32-bit floating decimal value (IEEE format), etc.

Note that this DDA set-up circuit 1341 is mounted not by a DSP structure as in the conventional case, but by an ASIC technique.

Figure 14:
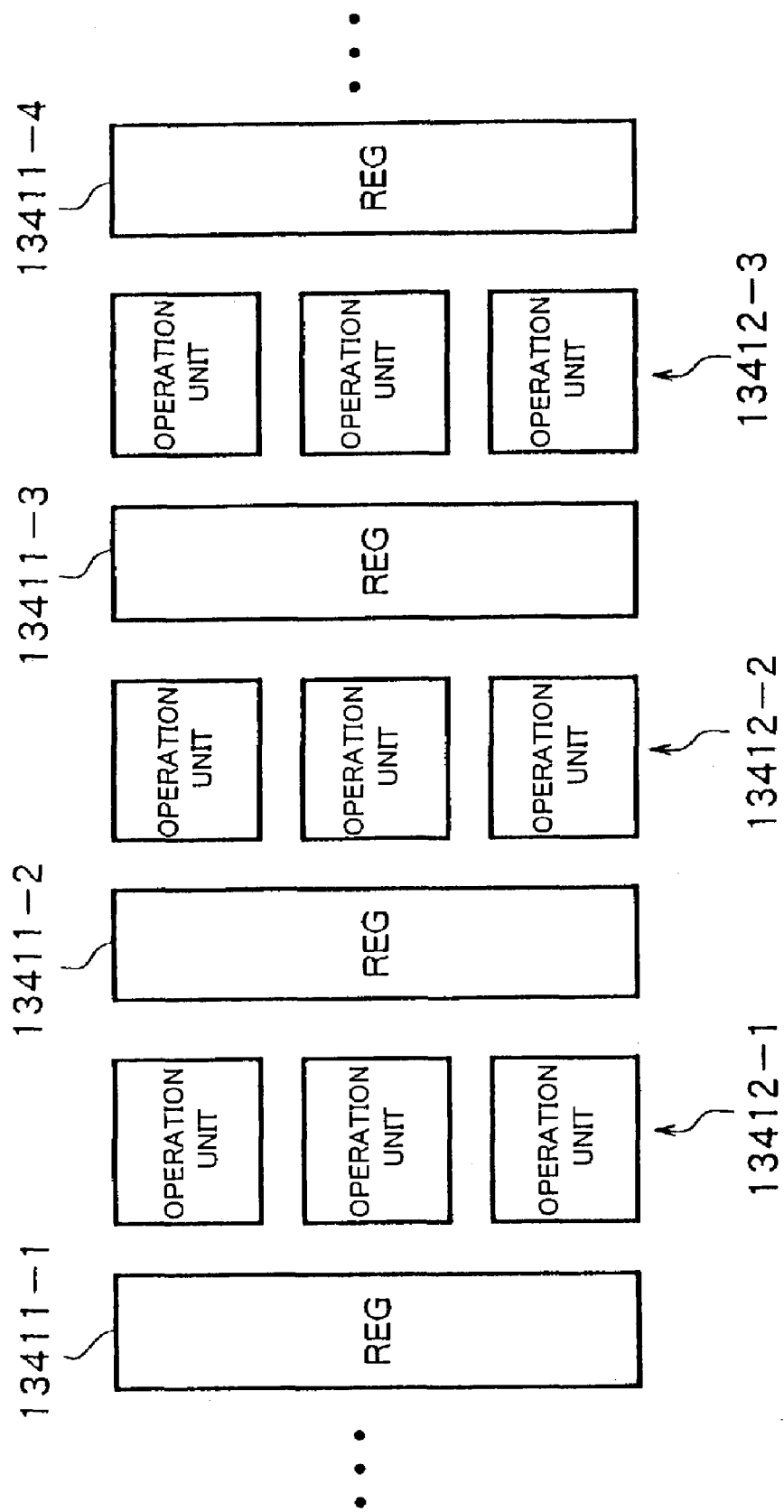
FIG. 14 is a view showing an example of the configuration of the DDA set-up circuit according to the present embodiment.

Specifically, as shown in FIG. 14, it is configured by a full data path logic obtained by inserting operation unit groups 13412-1 to 13412-3 each comprised of a plurality of operation units arranged in parallel among registers 13411-1 to 13411-4 arranged in multiple stages, in other words, as a synchronous pipeline type time parallel structure.

The triangle DDA circuit 1342 calculates the linearly interpolated (z, R, G, B, s, t, q) data at each pixel inside the triangle based on the set-up data S1341 of the information including the change data concerning the primitive input from the DDA set-up circuit 1341.

The triangle DDA circuit 1342 outputs the (x, y) data of each pixel and the (z, R, G, B, s, t, q) data at the (x, y) coordinates as the DDA data (interpolated data) S1342 to the texture engine circuit 1343.

Namely, the triangle DDA circuit 1342 performs rasterization for interpolating image parameters of all pixels included inside a polygon based on the image parameters found for the vertexes of the polygon.

Specifically, the triangle DDA circuit 1342 rasterizes the various data (z, texture coordinates, colors, etc.)

Also, the triangle DDA circuit 1342 outputs the page data S133b to the texture engine circuit 1343.

The texture engine circuit 1343 calculates the "s/q" and "t/q", calculates the texture coordinate data (u, v), reads out the (R, G, B) data from the graphics memory 135, etc. by the pipeline method.

Note that the texture engine circuit 1343 simultaneously performs processing for a plurality of (for example 4 or 8) pixels located in for example a predetermined square in parallel.

The texture engine circuit 1343 performs operation for dividing the s data by the q data and operation for dividing the t data by the q data for the (s, t, q) data indicated by the DDA data S1342.

The texture engine circuit 1343 is provided with for example exactly the number of not illustrated division circuits as the number of pixels to be processed in parallel (for example 8) and simultaneously divides "s/q" and "t/q"for 8 pixels. Further, it is also possible to mount them for interpolation operation processing from a representative point among the 8 pixels.

Further, the texture engine circuit 1343 multiplies the "s/q" and "t/q" of the division results by texture sizes USIZE and VSIZE to generate the texture coordinate data (u, v).

Further, the texture engine circuit 1343 outputs a read request including the generated texture coordinate data (u, v) to the graphics memory 135 via the memory I/F circuit 1344 and reads the texture data stored in the texture buffer included in the graphics memory 135 via the memory I/F circuit 1344 to thereby obtain the (R, G, B) data stored at the texture address corresponding to the (s, t) data.

The texture engine circuit 1343 generates the pixel data by for example multiplying the (R, G, B) data of the read (R, G, B) data and the (R, G, B) data included in the DDA data S1342 from the prior stage triangle DDA circuit 1342 with each other.

The texture engine circuit 1343 finally outputs this pixel data as the color value of the pixel to the memory I/F circuit 1344.

Also, the texture engine circuit 1343 outputs the page data S133b to the memory I/F circuit 1344.

Note that the texture buffer included in the graphics memory 135 stores MIPMAP (plural resolution textures) and other texture data corresponding to a plurality of reduction rates. Here, which texture data of which reduction rate is to be used is determined in units of triangles by using a predetermined algorithm.

The texture engine circuit 1343 directly uses the (R, G, B) data read from the texture buffer in the case of the full color mode.

On the other hand, the texture engine circuit 1343 transfers the data of a color index table prepared in advance to a temporary storage buffer comprised by a built-in SRAM or the like from a texture color look-up table (CLUT) buffer in the case of the index color mode and obtains the (R, G, B) data corresponding to the color index read from the texture buffer by using this color look-up table.

For example, when the color look-up table is comprised by a SRAM, if inputting the color index to an address of the SRAM, actual (R, G, B) data appears at the output thereof.

Here, so-called texture mapping will be further explained with reference to FIG. 15 and FIGS. 16A to 16C.

Figure 15:
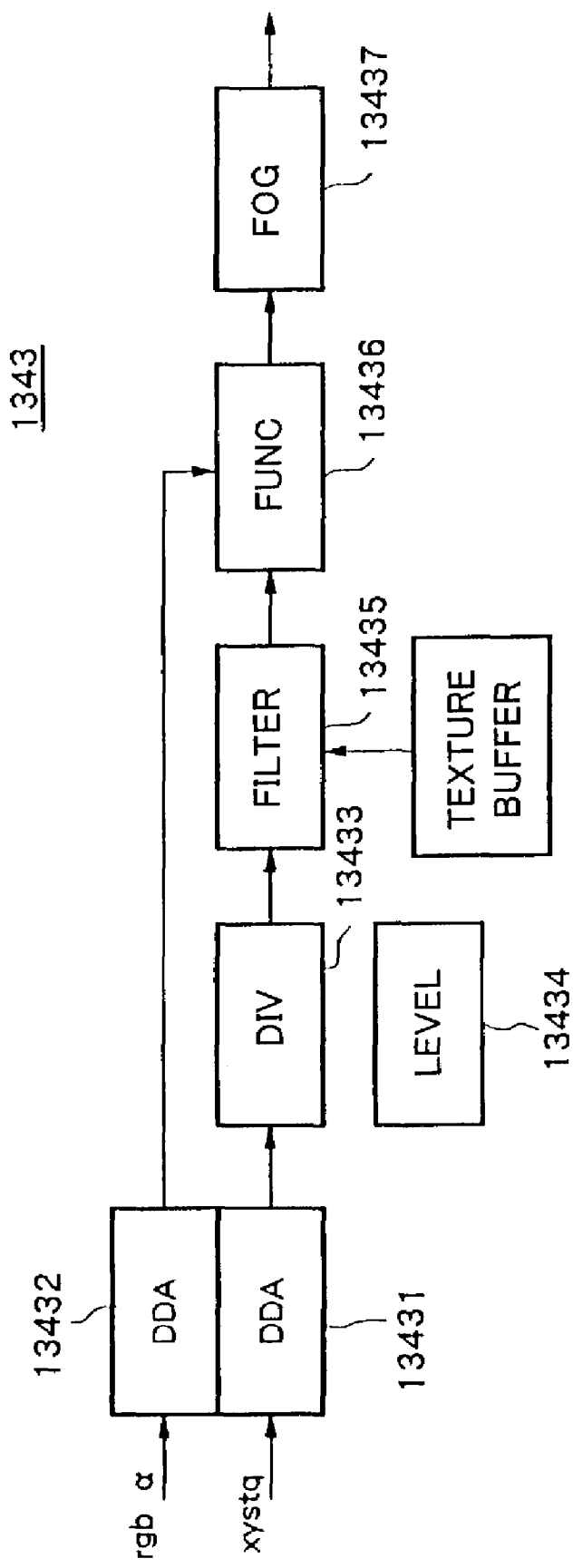
FIG. 15 is a block diagram of an example of the configuration of a texture mapping processing circuit in a texture engine circuit according to the present embodiment.
Figure 16A:
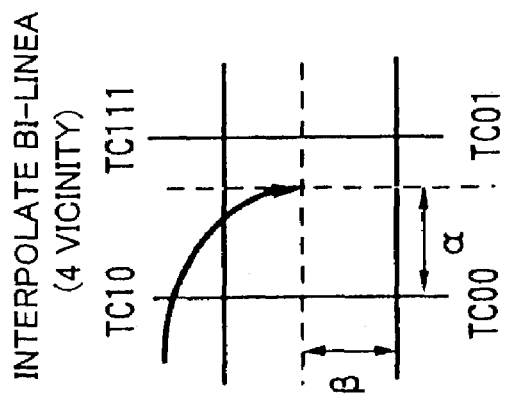
FIGS. 16A to 16C are views showing the image of actual texture mapping processing in the texture engine circuit according to the present embodiment.
Figure 16B:
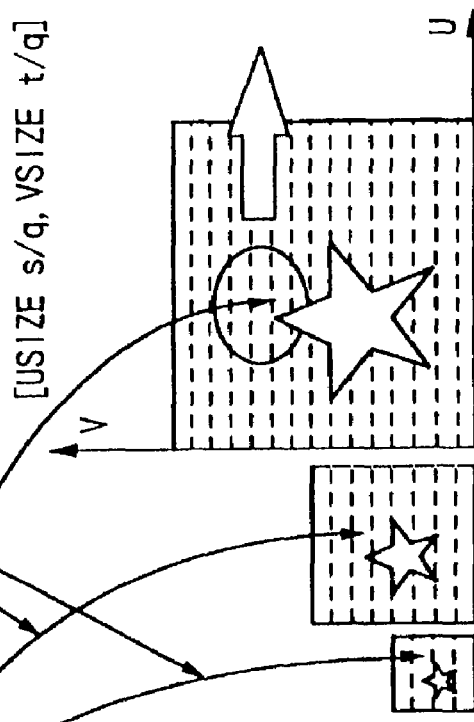
Figure 16C:
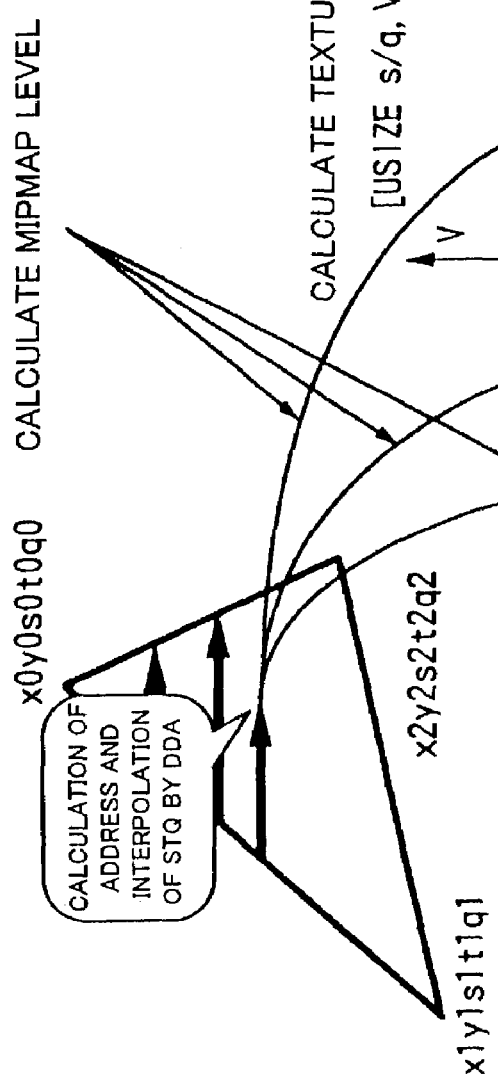

FIG. 15 is a block diagram of an example of the configuration of the texture mapping circuit in the texture engine circuit 1343, and FIGS. 16A to 16C are views showing an image of an actual texture mapping.

This texture mapping circuit has DDA circuits 13431 and 13432, a texture coordinate calculation circuit (Div) 13433, a MIPMAP level calculation circuit 13434, a filter circuit 13435, a first combining circuit (FUNC) 13436, and a second combining circuit (FOG) 13437.

In this texture mapping circuit, as shown in FIG. 16A, the DDA circuits 13431 and 13432 use the homogeneous coordinates s, t, q of the texture linearly interpolated inside the triangle and convert them to an actual address of the texture in Descartes coordinates (division by q).

Further, where performing MIPMAP etc., the MIPMAP level calculation circuit 13434 calculates the MIPMAP level. Then, as shown in FIG. 16B, the texture coordinate calculation circuit 13433 calculates the texture coordinates.

Further, the filter circuit 13435 reads the texture data of each level from the texture buffer included in the graphics memory 135 and performs point sampling using the same as it is, Bi-Linea (4 vicinity) interpolation, Tri-Linea interpolation, etc.

The texture color obtained there is processed as follows: Namely, the first combining circuit 13436 combines the input object color and the texture color, then the second combining circuit 13437 further combines fog color with the result to determine the color of the pixel to be finally drawn.

The memory I/F circuit 1344 compares the z-data corresponding to the pixel data S135 input from the texture engine circuit 1343 and the z-data stored in the z-buffer included in the graphics memory 135, judges whether or not the image drawn by the input pixel data is located closer (to the viewing point) than the image written in the graphics memory 135 (display buffer) the previous time, and, where it is located closer, updates the z-data stored in the z-buffer by the z-data corresponding to the image data.

Further, the memory I/F circuit 1344 writes the (R, G, B) data in the graphics memory 135 (display buffer).

Further, the memory I/F circuit 1344 calculates the memory block of the graphics memory 135 storing the texture data corresponding to the texture address at the pixel to be drawn from now on from that texture address and issues the read request to only that memory block to thereby read the texture data.

In this case, a memory block not holding the corresponding texture data is not accessed for reading the texture data, so it has become possible to provide a longer access time for the drawing.

The memory I/F circuit 1344, in the same way in drawing, reads the pixel data from the corresponding address for a modify write operation to the memory block of the graphics memory 135 storing the pixel data corresponding to the address of the pixel to be drawn from now on and writes back the same to the same address after modification.

When performing hidden plane processing, it reads the depth data from the corresponding address for a modify write operation to the memory block storing the depth data corresponding to the address of the pixel to be drawn from now on as well and, if necessary, writes back the same to the same address after modification.

Further, when receiving a read request including the generated texture coordinate data (u, v) for the graphics memory 135 from the texture engine circuit 1343, the memory I/F circuit 1344 reads the (R, G, B) data stored in the graphics memory 135.

Further, when receiving a request for reading the display data from the CRT control circuit 1345, the memory I/F circuit 1344 reads the display data in certain amounts, for example, in units of 8 pixels or 16 pixels, from the graphics memory 135 (display buffer) in response to this request.

The memory I/F circuit 1344 accesses (writes into or reads from) the graphics memory 135, but the write route and read route are configured as different routes.

Namely, in the case of writing, a write address ADRW and write data DTW are processed in a write system circuit and written into the graphics memory 135. In the case of reading, they are processed at a read system circuit and read from the graphics memory 135.

Further, the memory I/F circuit 1344 accesses the graphics memory 135 in units of for example 16 pixels based on an addressing of a predetermined interleave system.

In such transfer of the data with the memory, by performing plural parallel processing for the above processing, the drawing performances can be improved.

Particularly, by providing the same circuits for the triangle DDA portion and the texture engine portion in a parallel execution format (spatially parallel) or by finely inserting pipelines (temporally parallel), a plurality of pixels are simultaneously calculated.

In the memory blocks of the graphics memory 135, adjacent portions in the display region are arranged so as to become different memory blocks as will be explained later. Therefore, simultaneous processing can be carried out on a plane when generating a plane such as a triangle, so the probability of operation of each memory block becomes very high.

The graphics memory 135 acts as the texture buffer, display buffer, z-buffer, and texture CLUT (color look-up table) buffer.

Further, the graphics memory 135 is divided into a plurality of, for example four, modules having the same functions.

Further, the graphics memory 135 is made able to store more texture data by storing indexes of index colors and the color look-up table values for this purpose in the texture CLUT buffer.

The indexes and color look-up table values are used for the texture processing as explained above.

Namely, usually, a texture element is usually expressed by 24 bits in total of R, G, B each consisting of 8 bits, but the amount of data swells due to this. Therefore, one color is selected from among for example 256 colors selected in advance, and the data thereof is used for the texture processing. Due to this, if there are 256 colors, each texture element can be expressed by 8 bits. A conversion table from the indexes to the actual colors becomes necessary, but the higher the resolution of the texture, the more compact the texture data can be made.

By this, compression of the texture data becomes possible, and efficient utilization of the built-in memory becomes possible.

Further, the graphics memory 135 stores the depth information of the object to be drawn in order to perform the hidden plane processing simultaneously and parallel with the drawing.

Note that, as the method of storage of the display data and depth data and texture data, for example, the display data is continuously stored at a predetermined position of the memory block, for example, from the header, the depth data is stored next, and the texture data is stored in a continuous address space for every type of the texture in the remaining empty region.

Figure 17A:
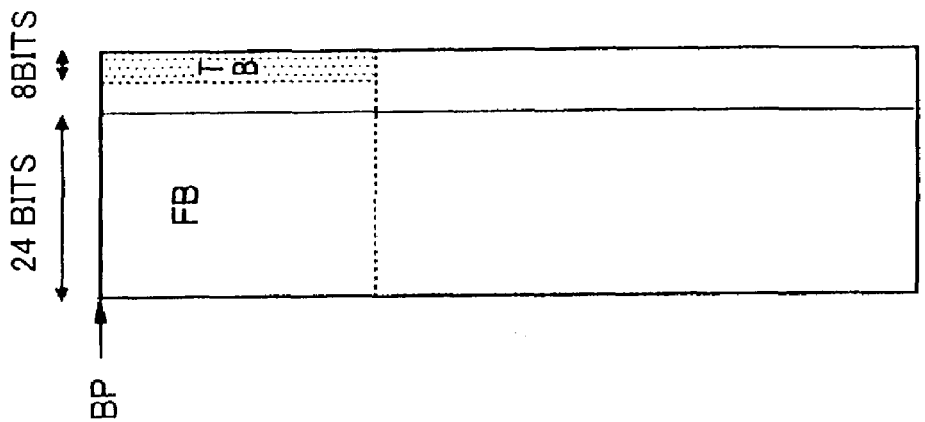
FIGS. 17A to 17C are views for explaining the concept of a method of storage of display data and depth data and texture data in a graphic memory according to the present embodiment.
Figure 17B:
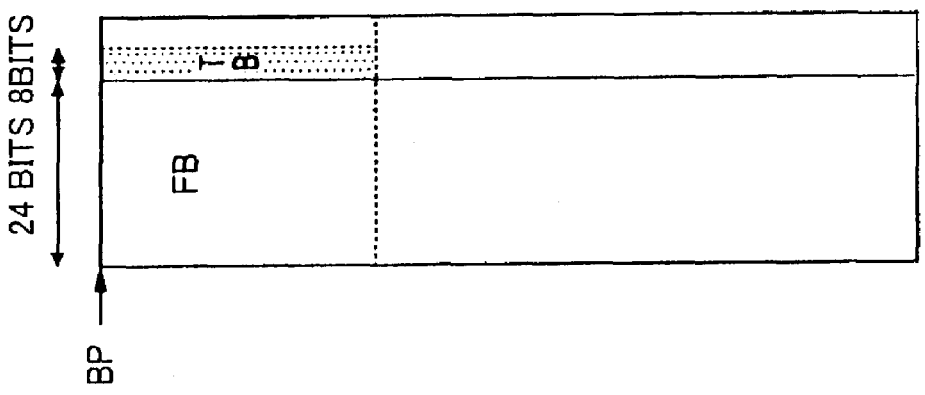
Figure 17C:
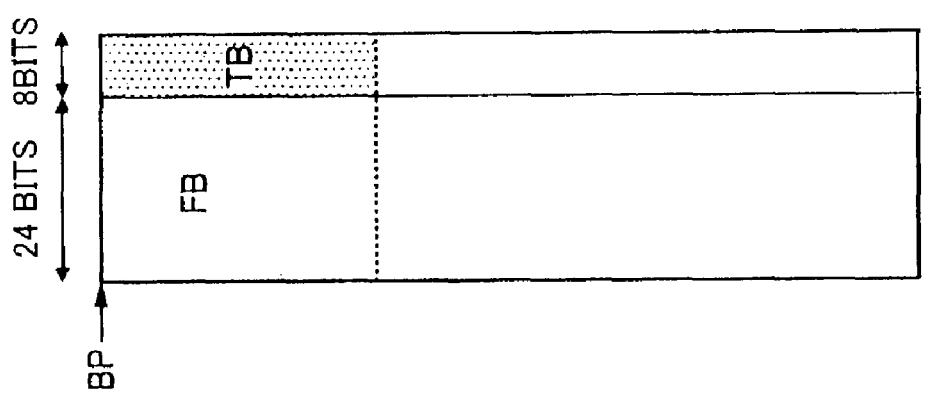

Conceptually explaining this with reference to the drawings, as shown in FIGS. 17A to 17C, the display data and the depth data are stored in for example a 24-bit width in a region indicated by FB in the figure from a position indicated by a so-called base pointer (BP), while the texture data is stored in a region of 8-bit width of the remaining empty region as indicated by TB in the figure. This means formation of a unified memory of the display data and texture data.

Due to this, the texture data can be more efficiently stored.

As described above, after the predetermined processing in the DDA set-up circuit 1341, the triangle DDA circuit 1342, the texture engine circuit 1343, the memory I/F circuit 1344, etc., the final memory access becomes the pixel, that is, the drawn picture cell element.

The CRT control circuit 1345 generates a display address for displaying the data on a not illustrated CRT in synchronization with given horizontal and vertical synchronization signals and outputs a request for reading the display data from the display buffer included in the graphics memory 135 to the memory I/F circuit 1344.

In response to this request, the memory I/F circuit 1344 reads the display data in certain amounts from the graphics memory 135 (display buffer).

The CRT control circuit 1345 includes for example an FIFO circuit for storing the display data read from the graphics memory 135 and generates index values of RGB at predetermined time intervals.

The CRT control circuit 1345 stores the R, G, B data corresponding to the index values, transfers the R, G, B data of the digital format corresponding to the index values of RGB which are generated to a not illustrated digital/analog (D/A) converter, and generates the R, G, B data of the analog format.

The CRT control circuit 1345 outputs these generated R, G, B data to a not illustrated CRT.

Next, an explanation will be given of the operation by the above configuration.

In the three-dimensional computer graphics system 10, in accordance with for example the state of progress of the application, the required graphics data is read out from the main memory 12 to the main processor 11.

The main processor 11 applies the predetermined processing to this graphics data to generate the triangle data S11a of the world coordinate system and outputs it to the graphics processor 13.

In the high order primitive mode such as curved surface processing, the main processor 11 generates high order primitive data S11b and outputs it to the graphics processor 13.

In the high order primitive mode, the high order primitive processing device 131 receives the high order primitive data S11b spanning a plurality of pages supplied from the main processor 11 and generates triangles so that one side among three sides of any triangle near a boundary between adjacent pages will be located at the boundary and therefore no generated triangle will straddle any page boundary.

Further, the high order primitive processing device 131 outputs the corresponding triangle data S131 generated for each page to the geometry processing device 132 together with each page information via the data bus 136.

The geometry processing device 132 performs coordinate conversion, clipping, lighting, and other geometry processing on the triangle data S11a from the main processor 11 or the triangle data S131 from the high order primitive processing device 131 input via the data bus 136.

Further, the geometry processing device 132 generates triangle data S132 and outputs the same to the triangle transfer control device 133.

The triangle transfer control device 133 receives the triangle data S132 from the geometry processing device 132, judges if a triangle is inside/outside a page by the drawing page judgment circuit 1331, and therefore detects a page where a triangle may be drawn.

Then, the drawing page judgment circuit 1331 prepares a list of pages where triangles composing the object will be drawn and stores it in the triangle memory device 1332.

The triangle transfer control device 133 takes out a page from this prepared list and outputs triangle data S133a and corresponding drawing page data S133b to the triangle drawing device 134 so as to draw the triangle for only the interior of the region of that page.

Also the triangle transfer control device 133 erases the output drawing page from the prepared list. It outputs triangle data S133a and corresponding drawing page data S133b to the triangle drawing device 134 until there are no longer any pages on the list to draw all triangles in the pages.

The triangle drawing device 134 generates change data indicating the difference from the sides of the triangle in the horizontal direction etc. at the DDA set-up circuit 1341 based on the polygon rendering data (triangle data) S133a.

Specifically, it calculates a change of the value to be found in a case of a unit length of movement by using the value of the start point and the value of the end point and a distance between the start point and the end point and outputs it as set-up data S1341 including the change data to the triangle DDA circuit 1342.

The triangle DDA circuit 1342 uses the set-up data S1341 including the change data to calculate the linearly interpolated (z, R, G, B, s, t, q) data at each pixel inside the triangle.

Then, this calculated (z, R, G, B, s, t, q) data and (x, y) data at each vertex of the triangle are output as the DDA data S1342 from the triangle DDA circuit 1342 to the texture engine circuit 1343.

Namely, the triangle DDA circuit 1342 performs rasterization for interpolating image parameters (z, texture coordinate, color, etc.) of all pixels included inside a polygon based on the image parameters found for the vertexes of the polygon.

Then, the triangle DDA circuit 1342 rasterizes the various data (z, texture coordinate, color, etc.) and outputs the result as the DDA data S1342 to the texture engine circuit 1343.

The texture engine circuit 1343 processes the (s, t, q) data indicated by the DDA data S1342 by dividing the s data by the q data and dividing the t data by the q data. Then, it multiplies the division results "s/q" and "t/q" by the texture sizes USIZE and VSIZE to generate the texture coordinate data (u v).

Next, a read request including the texture coordinate data (u, v) generated with respect to the memory I/F circuit 1344 is output from the texture engine circuit 1343, and the (R, G, B) data stored in the graphics memory 135 is read via the memory I/F circuit 1344.

Next, the texture engine circuit 1343 multiplies the (R, G, B) data of the read (R, G, B) data and the (R. G, B) data included in the DDA data S1342 from the prior stage triangle DDA circuit 1342 with each other to generate the pixel data.

This pixel data is output from the texture engine circuit 1343 to the memory I/F circuit 1344.

Then, the memory I/F circuit 1344 compares the z-data corresponding to the pixel data input from the texture engine circuit 1343 and the z-data stored in the z-buffer and judges whether or not the image drawn by the input pixel data S135 is located closer (to the viewing point) than the image written in the display buffer the previous time.

When the result of the decision is that it is located closer, the z-data stored in the z-buffer is updated by the z-data corresponding to the image data.

Next, the memory I/F circuit 1344 writes the (R, G, B) data into the display buffer of the graphics memory 135.

The data to be written (including also updating) is written into the predetermined memory in parallel via the write system circuit.

The memory I/F circuit 1344 calculates the memory block of the graphics memory 135 storing the texture corresponding to the texture address at the pixel to be drawn from now on by that texture address, issues a read request to only that memory block, and reads the texture data.

In this case, the memory blocks not holding the corresponding texture data are not accessed for the texture reading, so it becomes possible to provide more access time for drawing.

In the drawing as well, similarly the memory block storing the pixel data corresponding to the pixel address to be drawn from now on is accessed to read the pixel data from the corresponding address in order to perform the writing (modify write operation). After the modification, the pixel data is written back to the same address.

When performing hidden plane processing, the memory block storing the depth data corresponding to the pixel address to be drawn from now on is accessed as well to read the depth data from the corresponding address for performing the modify write operation. If necessary, this is written back to the same address after the modification.

Then, when displaying the image on a not illustrated CRT, the CRT control circuit 1345 generates the display address in synchronization with the given horizontal vertical synchronization frequency and issues a request for transfer of the display data to the memory I/F circuit 1344.

The memory I/F circuit 1344 transfers certain amounts of the display data to the CRT control circuit 1344 according to the request.

The CRT control circuit 1345 stores the display data in a not illustrated display use FIFO or the like and generates the index values of RGB at predetermined intervals.

The CRT control circuit 1345 stores the RGB values for the indexes of RGB and transfers the RGB values for the index values to the not illustrated D/A converter.

Then, the RGB signals converted to the analog signals at the D/A converter are transferred to the CRT.

As explained above, according to the present embodiment, since provision is made of the triangle transfer control device 133 for receiving the triangle data S132 from the geometry processing device 132, judging whether a triangle is inside/outside a page, detecting a page where a triangle may be drawn, preparing a list of pages where triangles will be drawn, taking out a page from this list, outputting the triangle data S133a and the corresponding drawing page data S133b to the triangle drawing device 134 so as to draw the object (triangle) for only the interior of the region of that page, erasing the output drawing page from the prepared list, and outputting triangle data S133a and corresponding drawing page data S133b until there are no longer pages on the list so as to draw all triangles in the pages, there is the advantage that penalties accompanying activation of the memory can be reduced and as a result images can be efficiently drawn.

While the invention has been described with reference to specific embodiments chosen for purpose of illustration, it should be apparent that numerous modifications could be made thereto by those skilled in the art without departing from the basic concept and scope of the invention.

What is claimed is:

1. An image processing apparatus for expressing a primitive as a combination of unit graphics and drawing unit graphics in a memory, the memory having memory regions (blocks) which can be activated at the same time and collected into predetermined page units, comprising:

a high order page primitive processing device for generating a plurality of unit graphics, effectively dividing the primitive into a plurality of unit graphics on each page spanned by said primitive so that a side of each generated unit graphic is located at, and not straddling, a boundary between adjacent spanned pages, and outputting the generated unit graphics for each spanned page;

a geometry processing device for performing geometry processing on the generated unit graphics for each spanned page, the geometry processing including coordinate conversion, clipping, and lighting;

a unit graphic transfer control device for detecting pages where the unit graphics may be drawn and generating unit graphic data and corresponding drawing page data so as to generate the unit graphic data for only the inside of the region of the detected pages, whereby the unit graphic data for the memory regions in each detected page is generated in parallel without a processing penalty; and a drawing device for receiving the unit graphic data and corresponding drawing page data from the unit graphic transfer control device and performing processing for drawing at least one unit graphic for a designated page, wherein the unit graphic transfer control device prepares a list of pages where unit graphics will be drawn, takes out a page from this list, outputs unit graphic data and corresponding drawing page data to the drawing device so as to draw the unit graphic for only the interior of the region of the taken out page, erases the output drawing page from the prepared list and outputs the unit graphic data and corresponding drawing page data to the drawing device until there are no longer any pages on the list.

2. An image processing apparatus as set forth in claim 1, wherein the unit graphic transfer control device detects a page where the unit graphic may be drawn by whether the unit graphic is inside/outside a page.

3. An image processing apparatus as set forth in claim 1, wherein the unit graphic transfer control device outputs the unit graphic data to the drawing device together with the corresponding drawing page data so as to draw all unit graphics in the region of a page.

4. An image processing apparatus as set forth in claim 1, wherein the unit graphic transfer control device has a drawing page judgment device and a memory device, the drawing page judgment device detects a page where a unit graphic may be drawn, stores the unit graphic data and the detected drawing page data which may be drawn in the memory device, selects one page at a time from the stored drawing page data, and outputs the unit graphic data and the corresponding drawing page data to be drawn on the selected page to the drawing device.

5. An image processing apparatus as set forth in claim 4, wherein the drawing page judgment device makes the memory device output the unit graphic data and the corresponding drawing page data to a processing circuit, then erase the selected page data.

6. An image processing method for expressing a primitive as a combination of unit graphics and drawing unit graphics in a memory comprising:

collecting memory regions (blocks) which can be activated at the same time into predetermined pages in the memory;

generating a plurality of unit graphics, effectively dividing the primitive into a plurality of unit graphics on each page spanned by said primitive so that a side of each generated unit graphic is located at, and not straddling, a boundary between adjacent spanned pages, and outputting the generated unit graphics for each spanned page;

performing geometry processing on the generated unit graphics for each spanned page, the geometry processing including coordinate conversion, clipping, and lighting;

detecting pages where unit graphics may be drawn;

generating and outputting unit graphic data and corresponding drawing page data so as to draw unit graphics for only the interior of the region of the detected pages; whereby the unit graphic data for the memory regions in each detected page is generated in parallel without a processing penalty; and receiving the generated unit graphic data and corresponding drawing page data and performing processing for drawing at least one unit graphic for a designated page, wherein the method further comprises:

preparing a list of pages where a unit graphic will be drawn;

taking out a page from the list and outputting the unit graphic data and the corresponding drawing page data;

drawing the unit graphic for only the interior of the region of the taken out page; and erasing one output drawing page from the prepared list and outputting unit graphic data and corresponding drawing page data until there are no longer any pages on the list.

7. An image processing method as set forth in claim 6, wherein detecting pages further comprises:

detecting a page where a unit graphic may be drawn by judging if a unit graphic is inside/outside of a page.

8. An image processing method as set forth in claim 6, wherein generating and outputting unit graphic data and corresponding drawing page data further comprises:

outputting the unit graphic data together with the corresponding drawing page data so as to draw all unit graphics in a page region.

* * * * *